US012259120B1

(12) United States Patent
Wu et al.

(10) Patent No.: US 12,259,120 B1
(45) Date of Patent: Mar. 25, 2025

(54) WATERPROOF LAMP

(71) Applicant: Signcomplex Limited, Shenzhen (CN)

(72) Inventors: Tiejun Wu, Shenzhen (CN); Anguo Luo, Shenzhen (CN); Weibin Lu, Shenzhen (CN)

( * ) Notice: Subject to any disclaimer, the term of this patent is extended or adjusted under 35 U.S.C. 154(b) by 0 days.

(21) Appl. No.: 18/787,705

(22) Filed: Jul. 29, 2024

(30) Foreign Application Priority Data

Mar. 22, 2024 (CN) ......................... 202420578625.5
Jun. 6, 2024 (CN) ......................... 202421300485.1

(51) Int. Cl.
*F21V 31/00* (2006.01)
*F21V 19/00* (2006.01)
*F21V 23/00* (2015.01)

(52) U.S. Cl.
CPC ........ *F21V 31/005* (2013.01); *F21V 19/0045* (2013.01); *F21V 23/002* (2013.01)

(58) Field of Classification Search
CPC .. F21V 31/005; F21V 19/0045; F21V 23/002; F21V 31/00; F21V 19/00; F21V 23/00; F21V 15/00; F21V 15/01
See application file for complete search history.

(56) References Cited

U.S. PATENT DOCUMENTS 10,330,306 B2 * 6/2019 Dyck ...................... E04H 4/148
11,555,607 B1 * 1/2023 Wei ......................... F21V 5/007
2017/0122544 A1 * 5/2017 Schmitt ...................... F21V 3/02
2022/0186921 A1 * 6/2022 Raposo ................. F21V 29/763

* cited by examiner

*Primary Examiner* — Bao Q Truong

(57) ABSTRACT

The present disclosure provides a waterproof lamp, including: a base provided with a mounting portion and a first connecting portion; a circuit board arranged on the mounting portion; and a sealing structure arranged around the mounting portion, the sealing structure being arranged between the base and a lens and configured to seal a gap between the base and the lens so as to allow the circuit board to be mounted in an accommodating cavity in a sealed manner.

9 Claims, 5 Drawing Sheets

WATERPROOF LAMP

TECHNICAL FIELD

The present disclosure relates to a lamp, and in particular to a waterproof lamp.

BACKGROUND

Point light sources are generally used for lighting decorations using built-in LED light sources, and the point light sources can emit light of various colors as required. In addition, with a built-in micro-control chip, and by means of programming control, the point light sources can realize full-color effects such as gradual color change, jump change, scanning and flowing. Moreover, by replacing display screens of some specifications with arrays or a combination of forms of pixels of multiple point light sources, the point light sources can exhibit various pattern, text, animation or video effects. The point light sources are a complement to linear light sources and flood lighting.

SUMMARY

An embodiment of the present disclosure provides a waterproof lamp, in order to solve the problems in related art. A technical solution is provided as follows.

The embodiment of the present disclosure provides a waterproof lamp, including:

- a base provided with a mounting portion and a first connecting portion;
- a circuit board arranged on the mounting portion;
- a lens having a lower portion resting over the base, the lens being arranged around the mounting portion, an accommodating cavity being formed between the lens and the base and configured to accommodate the circuit board, and the lens being provided with a second connecting portion connected to the first connecting portion so as to fix the lens and the base together; and
- a sealing structure arranged around the mounting portion, the sealing structure being arranged between the base and the lens and configured to seal a gap between the base and the lens so as to allow the circuit board to be mounted in the accommodating cavity in a sealed manner.

The above summary is merely for the purpose of description, and is not intended to being limiting in any way. In addition to the above described aspects, implementations and features, further aspects, implementations and features of the present disclosure will become readily apparent with reference to the accompanying drawings and the following detailed description.

BRIEF DESCRIPTION OF THE DRAWINGS

In figures, unless otherwise specified, the same or similar components or elements are denoted by the same reference signs throughout a plurality of figures. These figures are not necessarily drawn to scale. It should be understood that these figures depict only some implementations disclosed according to the present disclosure and are not to be construed as limiting the scope of the present disclosure.

LIST OF REFERENCE SIGNS

Figure 1:
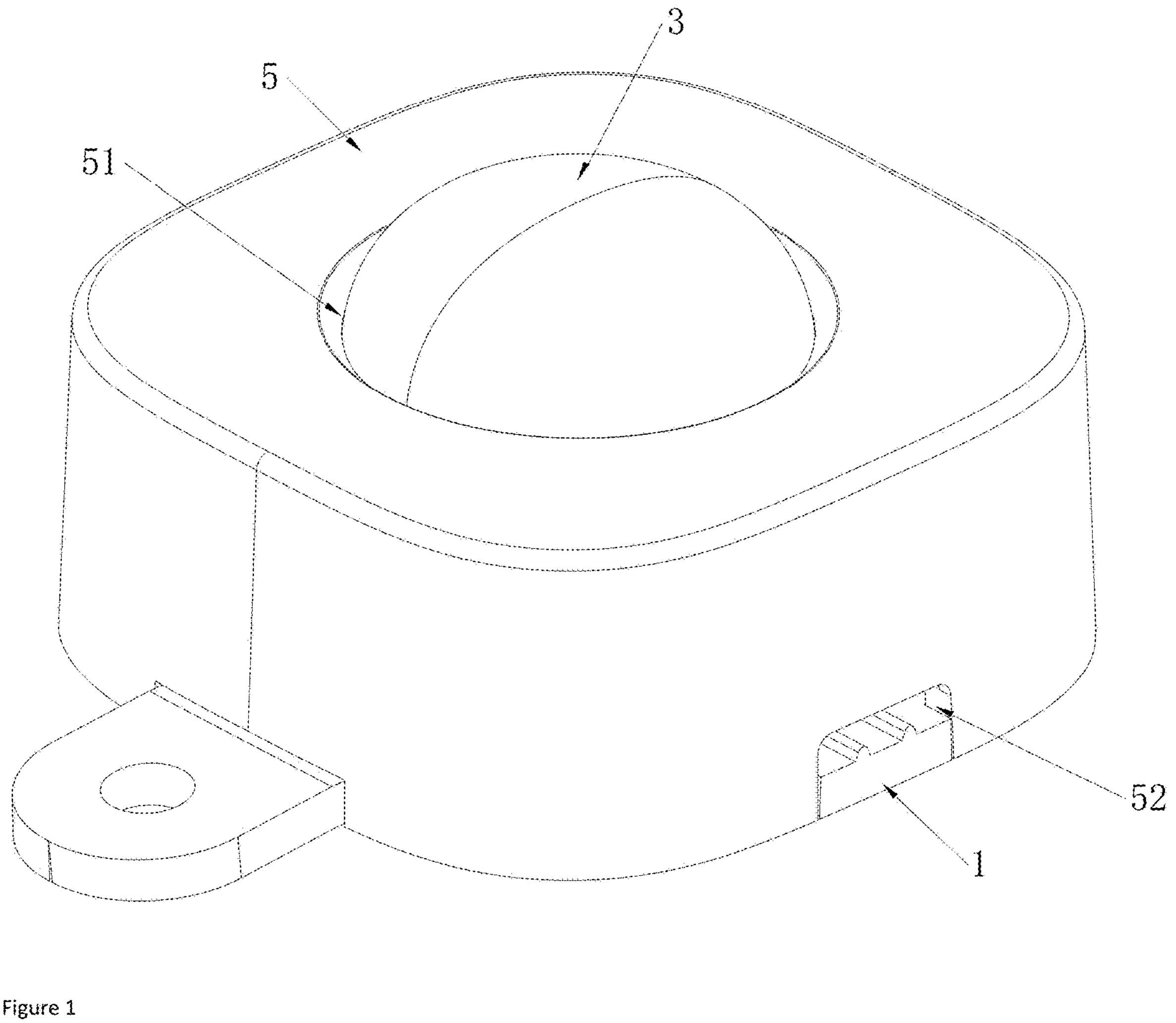
FIG. 1 is a schematic perspective view of the structure of a waterproof lamp according to a first embodiment of the present disclosure.

1. Base; 11. Mounting portion; 111. Accommodating recess; 112. Second wire outlet; 113. First bevel; 12. First connecting portion; 121. Connecting post; 122. Threaded hole; 13. Positioning groove; 14. Adhesive groove; 15. Raised ring; 151. Third wire outlet; 152. Second bevel; 16. First raised strip; 17. Second raised strip; 19. Retaining protrusion; 110. Supporting portion; 2. Circuit board; 21. Light source; 22. Retaining groove; 3. Lens; 31. Second connecting portion; 311. Connecting hole; 32. First wire outlet; 33. Third connecting portion; 34. First limiting portion; 41. Seal ring; 411. Retaining notch; 42. Sealing adhesive; 5. Housing; 51. Light-transmitting hole; 52. Fourth wire outlet; 6. Fastener; 61. Second limiting portion; 62. Screw rod.

DESCRIPTION OF THE PREFERRED EMBODIMENTS

Only some exemplary embodiments will be briefly described below. As can be appreciated by those skilled in the art, modifications may be made to the described embodiments in various ways without departing from the spirit or scope of the present disclosure. Therefore, the drawings and the description are considered as exemplary in nature rather than limiting.

FIGS. 1-6 illustrate a waterproof lamp according to a preferred implementation of the present disclosure. The waterproof lamp includes:

- a base 1 provided with a mounting portion 11 and a first connecting portion 12;
- a circuit board 2 arranged on the mounting portion 11, the circuit board 2 being electrically connected to a light source 21;
- a lens 3 having a lower portion resting over the base 1, where the lens 3 is arranged around the mounting portion 11, an accommodating cavity is formed between the lens 3 and the base 1 and configured to accommodate the circuit board 2, the lens 3 is provided with a second connecting portion 31, the second connecting portion 31 is connected to the first connecting portion 12 so as to fix the lens 3 and the base 1 together, and the lens 3 is configured to transmit light emitted by the light source 21 to the outside; and
- a sealing structure arranged around the mounting portion 11, the sealing structure being arranged between the base 1 and the lens 3 and configured to seal a gap between the base 1 and the lens 3 so as to allow the circuit board 2 to be mounted in the accommodating cavity in a sealed manner.

In the waterproof lamp according to the present disclosure, the circuit board 2 is arranged on the mounting portion 11 to enable the circuit board 2 to be mounted on the base 1, and the accommodating cavity is formed between the lens 3 and the base 1 to accommodate the circuit board 2 so as to enable the circuit board 2 to be encapsulated inside the waterproof lamp. Since the base 1 and the lens 3 are fixedly connected together by a connecting structure composed of the first connecting portion 12 and the second connecting portion 31, the base 1 and the lens 3 can be reliably fixed together, achieving a higher structural reliability. In addition, since the sealing structure is arranged around the mounting portion 11 and can seal the gap between the base 1 and the lens 3, the circuit board 2 can be reliably mounted in the accommodating cavity in a sealed manner, instead of the sealed mounting of the circuit board 2 by means of filling an adhesive into the interior of a housing 5 in the prior art, such that the processing process is simplified and the defective rate can be effectively reduced, and the stability of a connection between the base 1 and the lens 3 is also improved, resulting in a higher reliability of sealing the circuit board 2.

Figure 2:
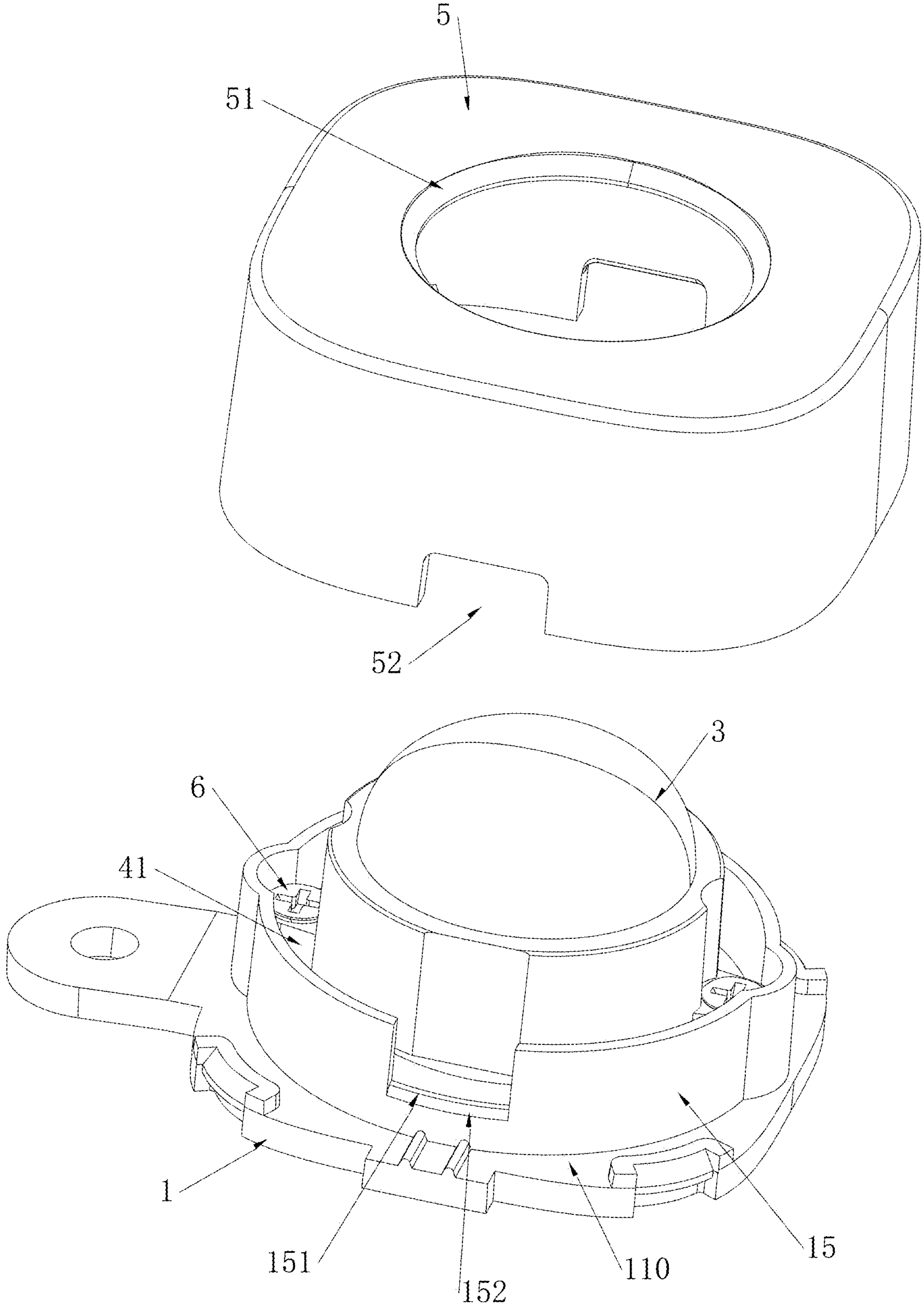
FIG. 2 is an exploded view of the waterproof lamp according to the first embodiment of the present disclosure.
Figure 3:
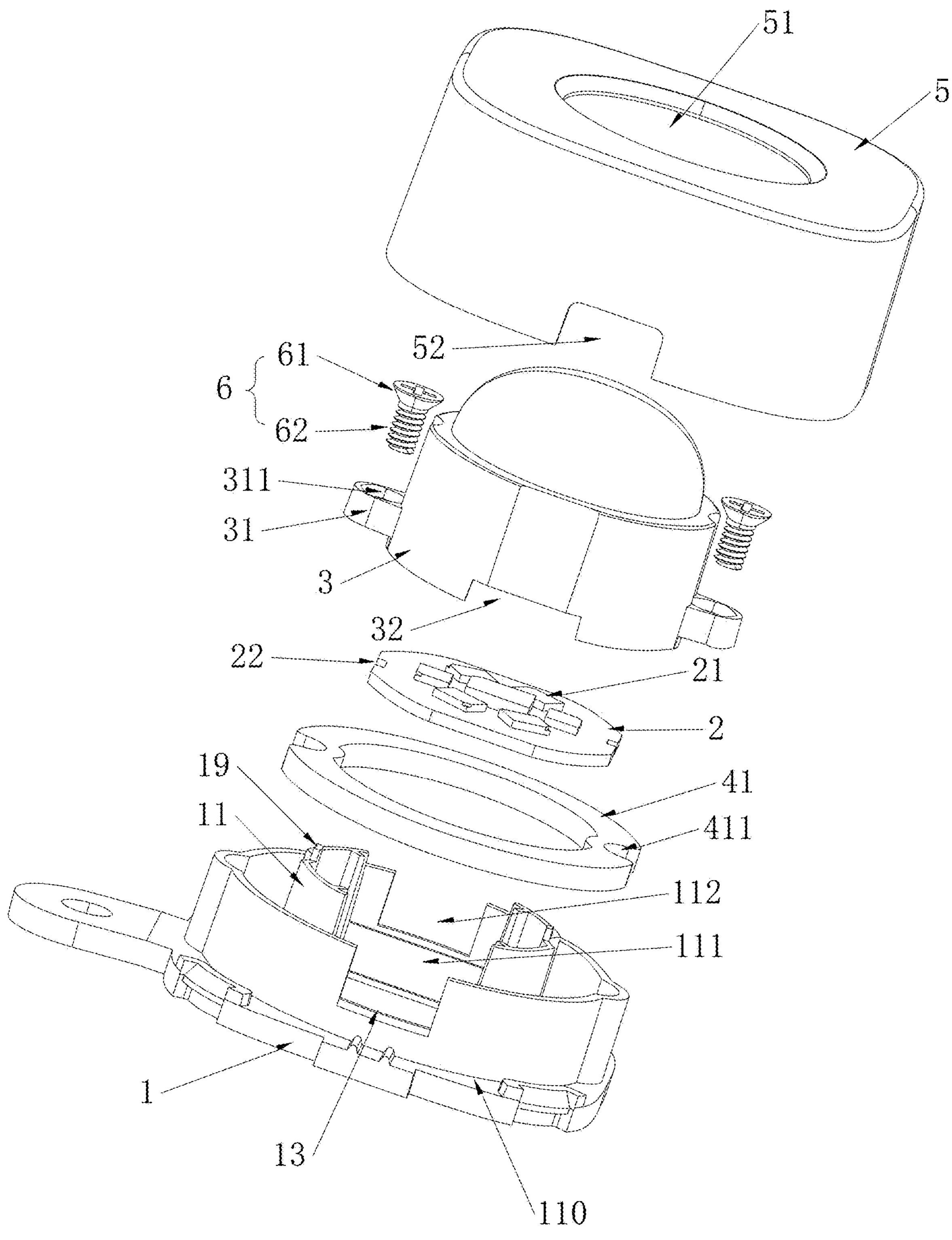
FIG. 3 is an exploded view of the waterproof lamp according to the first embodiment of the present disclosure.
Figure 4:
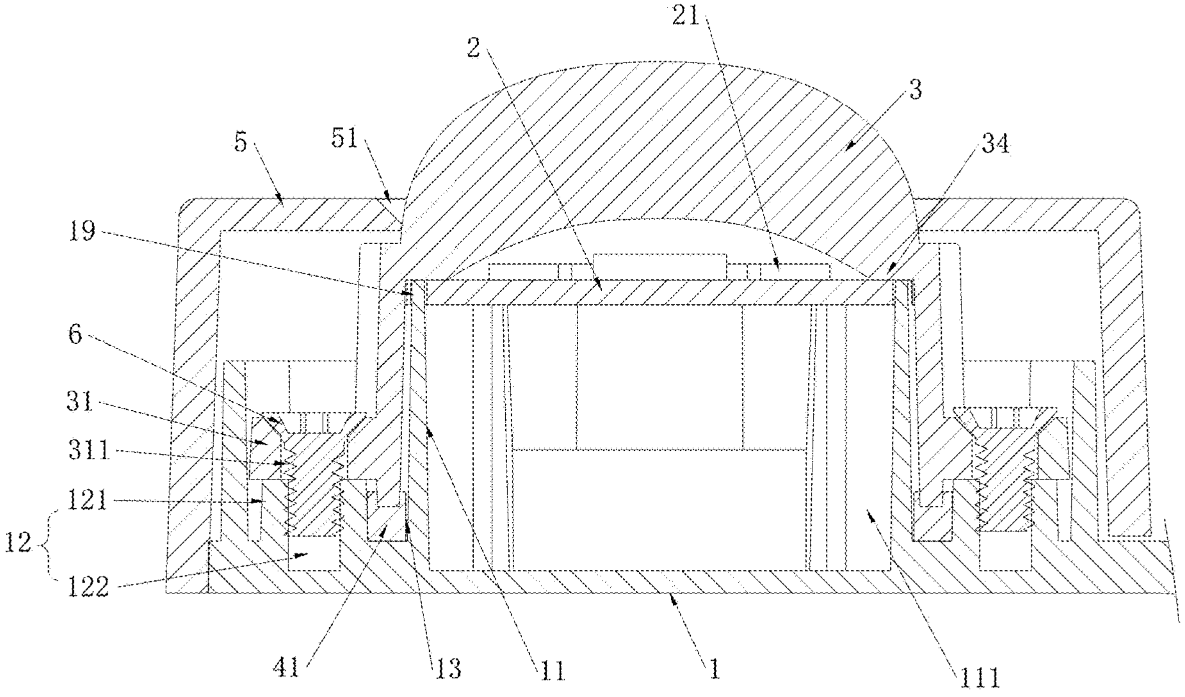
FIG. 4 is a cross-sectional view of the waterproof lamp according to the first embodiment of the present disclosure.

Referring to FIGS. 2-4, in an implementation, the sealing structure includes a seal ring 41. The seal ring 41 is sandwiched between the base 1 and the lens 3 to allow the seal ring 41 to be pressed against the base 1 and the lens 3 by tension forces from both of the first connecting portion and the second connecting portion, so as to cause a bottom surface of the seal ring 41 to come into close contact with the base 1 and to cause a top surface of the seal ring 41 to come into close contact with the lens 3, achieving the sealing of the gap between the base 1 and the lens 3 without a sealing adhesive 42, so that the structural reliability is high, and the mounting efficiency can be increased without waiting for the adhesive to become dry.

Referring to FIGS. 3 and 4, in an implementation, the base 1 is further provided with a positioning groove 13. The positioning groove 13 is arranged around the mounting portion 11, and the positioning groove 13 fits with the seal ring 41. In this way, the seal ring 41 can be mounted and positioned in place by arranging the seal ring 41 in the positioning groove 13, enabling quick mounting of the seal ring 41, while ensuring that the seal ring 41 is mounted in a set position, thereby enabling the seal ring 41 to reliably seal the gap between the base 1 and the lens 3, such that the reliability of sealing can be improved, resulting in a better waterproof performance.

Referring to FIGS. 3-4, in an implementation, the base 1 is further provided with a connecting post 121.

The seal ring 41 has a retaining notch 411 in a peripheral wall, and the retaining notch 411 fits with the connecting post 121. In this way, the retaining notch 411 fits with the connecting post 121 to allow for an effect of retaining an outer periphery of the seal ring 41, such that the seal ring 41 is limited from moving outwardly, and the seal ring 41 is ensured to be mounted in the set position, resulting in a higher structural reliability.

Figure 5:
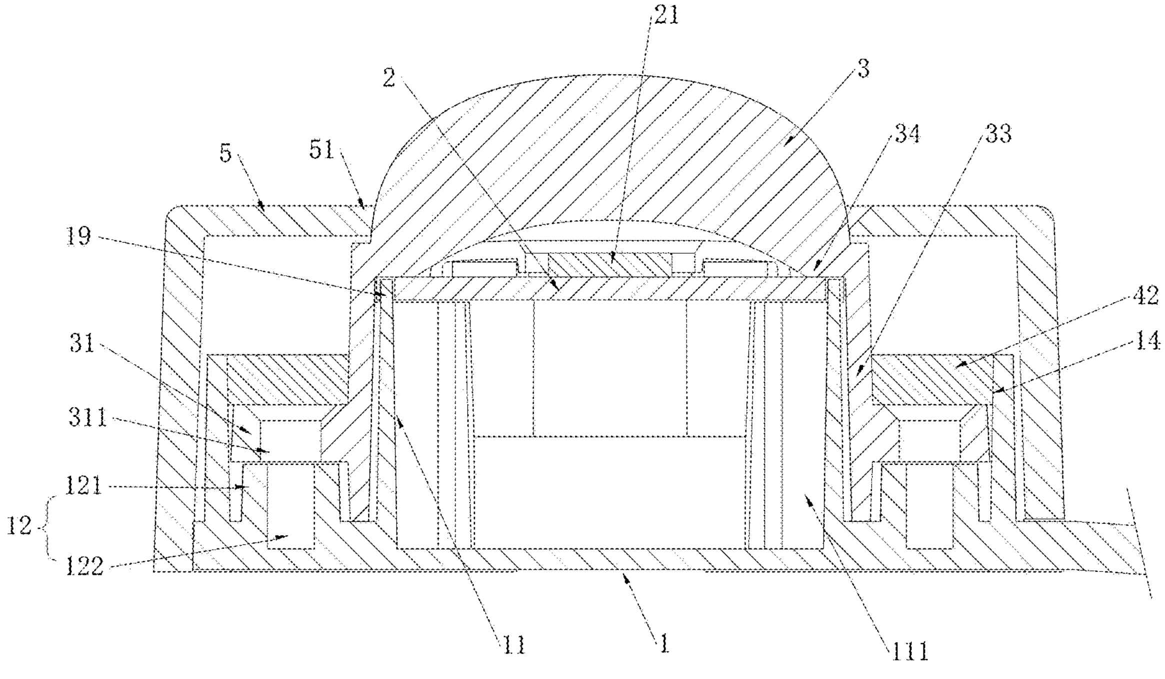
FIG. 5 is an exploded view of a waterproof lamp according to a second embodiment of the present disclosure.
Figure 6:
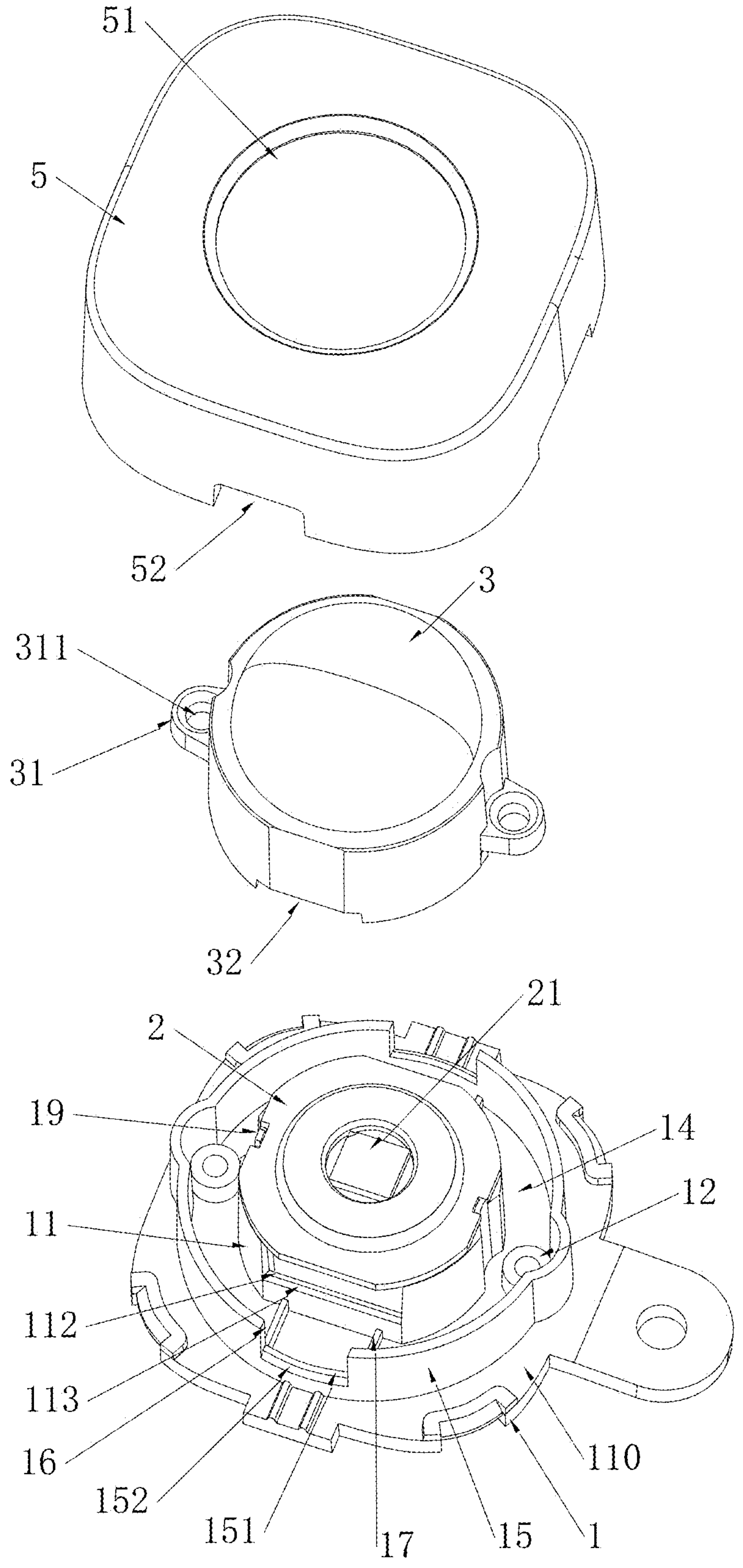
FIG. 6 is a cross-sectional view of the waterproof lamp according to the second embodiment of the present disclosure.

Referring to FIGS. 5-6, in an implementation, the base 1 has an adhesive groove 14, and the adhesive groove 14 is arranged around the mounting portion 11.

The lens 3 is further provided with a third connecting portion 33, the third connecting portion 33 is arranged around the mounting portion 11, and the third connecting portion 33 rests over the adhesive groove 14.

The sealing structure includes a sealing adhesive 42, and the sealing adhesive 42 covers the adhesive groove 14 so as to fixedly connect the base 1 to the third connecting portion 33. Such a structure enables the sealing of the gap between the base 1 and the lens 3, and also enhances the stability of the connection between the base 1 and the lens 3, resulting in a higher waterproof stability. In addition, sealing is achieved only by filling an adhesive in the adhesive groove 14, which reduces the amount of adhesive used and reduces the cost. Moreover, the assembly process is simple, the yield rate is high, and the mounting efficiency is high.

Referring to FIG. 6, in an implementation, the base 1 is provided with a raised ring 15, the raised ring 15 is located outside the mounting portion 11 and surrounds the mounting portion 11, and the adhesive groove 14 is formed between the raised ring 15 and the mounting portion 11. With the above structure, the structure is simple, and the adhesive groove 14 is manufactured more easily and efficiently. In other implementations, no raised ring 15 may be provided on the base 1, and the adhesive groove 14 is of a recessed structure in the base 1.

In other implementations, the sealing structure may further include a sealing adhesive tape sandwiched between the base 1 and the lens 3, which can also achieve reliable sealing of the gap between the base 1 and the lens 3 to mount the circuit board 2 in a sealed manner.

Referring to FIGS. 3 and 6, in an implementation, the lens 3 has a first wire outlet 32, and the first wire outlet 32 is configured for passage of a wire of the circuit board 2. The sealing adhesive 42 is arranged between the first wire outlet 32 and the wire of the circuit board 2, and the sealing adhesive 42 is used to seal the first wire outlet 32. The first wire outlet 32 is provided for the wire of the circuit board 2 to pass through to the outside so as to electrically connected the wire to an external power supply, realizing power supply to the circuit board 2 and ensuring that the light source 21 can be lit. Moreover, the first wire outlet 32 can be reliably sealed by means of the sealing adhesive 42, such that the accommodating cavity is completely sealed and the circuit board 2 is reliably mounted inside the waterproof lamp, thereby improving the waterproof performance of the circuit board 2.

In other implementations, no first wire outlet 32 may be provided, and the circuit board 2 may also be powered by means of a power supply built in the waterproof lamp.

Referring to FIGS. 3-5, in an implementation, the mounting portion 11 has an accommodating recess 111 and a second wire outlet 112. The accommodating recess 111 extends through the top of the mounting portion 11, and the accommodating recess 111 accommodates an end of the wire of the circuit board 2 that is located close to the circuit board 2. The second wire outlet 112 is located on a side of the mounting portion 11, the second wire outlet 112 is in communication with the accommodating recess 111, and the second wire outlet 112 is configured to allow the other end of the wire that is located away from the circuit board 2 to pass beyond the mounting portion 11. The second wire outlet 112 is also sealed by the sealing adhesive 42 to prevent liquid, such as water, from entering the accommodating recess 111, such that the sealing performance of the circuit board 2 can be further improved, resulting in a higher waterproof reliability.

Referring to FIG. 6, in an implementation, a first bevel 113 is provided on a bottom surface of the second wire outlet 112. The first bevel 113 has an end close to an inner side of the mounting portion 11 higher than at the other end close to an outer side of the mounting portion 11, such that the wear of the wire by a corner of the bottom surface of the second wire outlet 112 can be reduced.

In other implementations, a first chamfer instead of the first bevel 113 may be provided on the bottom surface of the second wire outlet 112, or no first bevel 113 or first chamfer may be provided on the bottom surface of the second wire outlet 112.

Referring to FIG. 6, in an implementation, the second wire outlet 112 is located at an end close to the adhesive groove 14, a first raised strip 16 and a second raised strip 17 are provided on the adhesive groove 14, and a spacing between the first raised strip 16 and the second raised strip 17 forms a wire passage. With such a structure, the provision of the wire passage allows the wire to be arranged in a more orderly and organized manner, and the provision of the first raised strip 16 and the second raised strip 17 allows the sealing adhesive 42 to be bonded to the adhesive groove 14 more firmly, thereby improving the waterproof stability.

Referring to FIG. 6, in an implementation, each of the first raised strip 16 and the second raised strip 17 is connected to the mounting portion 11 at one end, and each of the first raised strip 16 and the second raised strip 17 is connected to the raised ring 15 at the other end, so as to improve the structural strength of the base 1 and thus improve the structural stability of the waterproof lamp.

Referring to FIG. 6, in an implementation, the raised ring 15 has a third wire outlet 151, the third wire outlet 151 is configured for passage of the end of the wire that is away from the circuit board 2. The third wire outlet 151 is also sealed by the sealing adhesive 42 to prevent liquid, such as water, from entering the raised ring 15 through the third wire outlet 151, thereby improving the waterproof reliability.

Referring to FIG. 6, in an implementation, a second bevel 152 is provided on a bottom surface of the third wire outlet 151. The second bevel 152 has an end close to the mounting portion 11 higher than the other end close to the outer side of the mounting portion 11, such that the wear of the circuit board 2 by a corner of the bottom surface of the third wire outlet 151 can be reduced.

In other implementations, a second chamfer instead of the second bevel 152 may be provided on the bottom surface of the third wire outlet 151, or no second bevel 152 or second chamfer may be provided on the bottom surface of the third wire outlet 151.

Referring to FIGS. 1-6, in an implementation, the waterproof lamp further includes

- a housing 5 having a lower portion arranged on the base 1, and the housing 5 is arranged around the lens 3. The housing 5 has a light-transmitting hole 51, the light-transmitting hole 51 fits with an upper portion of the lens 3, and a wall of the light-transmitting hole 51 abuts against the upper portion of the lens 3, so as to cause the housing 5 to come into close contract with the lens 3. In this way, the housing 5 can be used for protecting the lens 3, which can further prevent water from entering the interior of the accommodating cavity, resulting in a higher waterproof reliability.

In an implementation, the upper portion of the lens 3 extends beyond the housing 5 through the light-transmitting hole 51 to increase an angle of diffusion of light emitted by the light source 21, so as to enable a larger irradiation angle of the waterproof lamp.

In an implementation, the housing 5 is connected to the base 1 in a snap-fit manner, such that the housing 5 and the base 1 are ensured to be securely connected together, and the mounting efficiency of the housing 5 on the base 1 can also be improved.

In other implementations, the housing 5 may also be connected to the base 1 by means of bolting, soldering, welding, etc.

In an implementation, the housing 5 has a fourth wire outlet 52, and the fourth wire outlet 52 is provided for the end of the wire that is away from the circuit board 2 to pass through to the outside so as to electrically connect the wire to an external power supply. The fourth wire outlet 52 is also sealed by the sealing adhesive 42 to prevent liquid, such as water, from entering the interior of the housing 5 through the fourth wire outlet 52, thereby improving the waterproof reliability.

Referring to FIGS. 3-4, in an implementation, one of the mounting portion 11 and the circuit board 2 is provided with a retaining groove 22, the other is provided with a retaining protrusion 19, and the retaining protrusion 19 fits with the retaining groove 22 so as to retain the circuit board 2, which facilitates the quick mounting of the circuit board 2, and can also limit the circuit board 2 from circumferentially rotating to allow the circuit board 2 to be reliably mounted on the base 1, thereby ensuring the operating reliability of the waterproof lamp.

In an implementation, two retaining grooves 22 and two retaining protrusions 19 are provided, the two retaining grooves 22 are arranged spaced apart from each other, and the respective retaining protrusions 19 fit with the respective retaining grooves 22 in a one-to-one correspondence.

In other implementations, one or three or more retaining grooves 22 and retaining protrusions 19 may be provided.

In an implementation, the lens 3 is provided with a first limiting portion 34, and the first limiting portion 34 abuts against the circuit board 2 so as to limit the circuit board 2 on the mounting portion 11 and prevent the movement of the circuit board 2 in the accommodating cavity, such that the light source 21 can be ensured to be reliably lit and abnormal noises can also be prevented.

In an implementation, the base 1 is further provided with a supporting portion 110, and the supporting portion 110 is arranged around the mounting portion 11. The supporting portion 110 is connected to the lower portion of the lens 3, the mounting portion 11 protrudes upwardly relative to the supporting portion 110, and an upper portion of the mounting portion 11 extends to a side close to the upper portion of the lens 3. The mounting portion 11 protrudes upwardly relative to the supporting portion 110, which can lift the circuit board 2 to make the circuit board 2 remote from a connection between the base 1 and the lens 3, such that the waterproof effect can be served, even if the sealed connection between the base 1 and the lens 3 fails.

Referring to FIGS. 3-4, in an implementation, the first connecting portion 12 has a threaded hole 122, and the second connecting portion 31 has a connecting hole 311.

The waterproof lamp further includes a fastener 6, and the fastener 6 is provided with a second limiting portion 61 and a screw rod 62 that are connected to each other. The second limiting portion 61 abuts against the second connecting portion 31, and the screw rod 62 passes through the connecting hole 311 and the threaded hole 122 in sequence and is screwed in the threaded hole 122. In this way, the base 1 is connected to the lens 3 by connecting the screw rod 62 to the connecting hole 311 and the threaded hole 122. Moreover, the second limiting portion 61 abuts against the lens 3 to ensure that the screw rod 62 is reliably connected to the connecting hole 311 and the threaded hole 122, such that the stability of the connection between the base 1 and the lens 3 can be enhanced, resulting in a higher structural reliability.

In other implementations, the first connecting portion 12 may be directly connected to the second connecting portion 31, for example, by means of a snap-fit structure, a magnetic structure, a plug-in structure, or other appropriate structures, which are not limited thereto.

In the description of this specification, descriptions made with reference to the terms such as "an embodiment", "some embodiments", "example", "specific example", or "some examples" mean that specific features, structures, materials, or characteristics described with reference to the embodiment or example are included in at least one embodiment or example of the present disclosure. Moreover, the specific features, structures, materials or characteristics described can be combined in any one or more embodiments or examples in any suitable manner. In addition, without any contradiction, those skilled in the art may incorporate and combine different embodiments or examples and features of the different embodiments or examples described in this specification.

In addition, the terms "first" and "second" are merely used for illustration, and may not be construed as indicating or implying relative importance or implicitly indicating the number of technical features indicated. Thus, the features defined with "first" and "second" may explicitly or implicitly include at least one of the features. In the description of the present disclosure, the term "plurality of" means two or more, unless specifically and specifically defined otherwise.

The above descriptions are merely specific implementations of the present disclosure, but are not intended to limit the scope of protection of the present disclosure. Any variation or replacement readily conceived by those skilled in the art within the technical scope disclosed in the present disclosure shall fall within the scope of protection of the present disclosure. Therefore, the scope of protection of the present disclosure shall be subject to the scope of protection of the claims.

The invention claimed is:

1. A waterproof lamp, comprising:

a base provided with a mounting portion and a first connecting portion;

a circuit board arranged on the mounting portion;

a lens having a lower portion resting over the base, the lens being arranged around the mounting portion, an accommodating cavity being formed between the lens and the base and configured to accommodate the circuit board, and the lens being provided with a second connecting portion connected to the first connecting portion so as to fix the lens and the base together; and a sealing structure arranged around the mounting portion, the sealing structure being arranged between the base and the lens and configured to seal a gap between the base and the lens so as to allow the circuit board to be mounted in the accommodating cavity in a sealed manner;

wherein the lens has a first wire outlet for passage of a wire of the circuit board, and a sealing adhesive is provided between the first wire outlet and the wire of the circuit board to seal the first wire outlet.

2. The waterproof lamp according to claim 1, wherein the sealing structure comprises a seal ring sandwiched between the base and the lens.

3. The waterproof lamp according to claim 2, wherein the base has a positioning groove arranged around the mounting portion and fitting with the seal ring.

4. The waterproof lamp according to claim 2, wherein the base is further provided with a connecting post; and a retaining notch is provided in a peripheral wall of the seal ring, the retaining notch fitting with the connecting post.

5. The waterproof lamp according to claim 1, wherein the base has an adhesive groove arranged around the mounting portion;

the lens is further provided with a third connecting portion, the third connecting portion being arranged around the mounting portion and resting over the adhesive groove; and the sealing structure comprises a sealing adhesive covering the adhesive groove so as to fixedly connect the base and the third connecting portion together.

6. The waterproof lamp according to claim 1, wherein the waterproof lamp further comprises:

a housing having a lower portion arranged on the base, the housing being arranged around the lens and having a light-transmitting hole that fits with an upper portion of the lens, and a wall of the light-transmitting hole abutting against the upper portion of the lens.

7. The waterproof lamp according to claim 1, wherein a retaining groove is provided in one of the mounting portion and the circuit board, and a retaining protrusion is provided on the other of the mounting portion and the circuit board, the retaining protrusion fitting with the retaining groove.

8. The waterproof lamp according to claim 1, wherein the lens is provided with a first limiting portion, the first limiting portion abutting against the circuit board to limit the circuit board on the mounting portion.

9. The waterproof lamp according to claim 1, wherein the base is further provided with a supporting portion, the supporting portion being arranged around the mounting portion and connected to a lower portion of the lens, the mounting portion protruding upwardly relative to the supporting portion, and an upper portion of the mounting portion extending to a side close to an upper portion of the lens.

* * * * *